(12) United States Patent
Christman et al.

(10) Patent No.: US 11,353,153 B2
(45) Date of Patent: Jun. 7, 2022

(54) HELICAL STRAKE ATTACHMENT FOR TUBULAR STRUCTURAL MEMBERS

(71) Applicant: Trinity Meyer Utility Structures, LLC, Dallas, TX (US)

(72) Inventors: Bernie Christman, Elmwood, WI (US); Brandon G. Boe, Ellsworth, WI (US); Daniel J. Sterny, Beldinville, WI (US); Richard M. Slocum, Cordova, TN (US); Mark H. Fairbairn, Red Wing, MN (US); Jason Van Wyhe, Barronett, WI (US); Harold W. Fonville, II, Memphis, TN (US); Troy Van Brunt, Maiden Rock, WI (US); Aubrey L. Jackson, Collierville, TN (US); Richard J. Hunter, Dallas, TX (US); David M. Ramsay, Elmwood, IL (US)

(73) Assignee: MEYER UTILITY STRUCTURES LLC, Dallas, TX (US)

( * ) Notice: Subject to any disclaimer, the term of this patent is extended or adjusted under 35 U.S.C. 154(b) by 903 days.

(21) Appl. No.: 16/163,765

(22) Filed: Oct. 18, 2018

(65) Prior Publication Data
US 2020/0124221 A1 Apr. 23, 2020

(51) Int. Cl.
| | |
|---|---|
| F16L 55/033 | (2006.01) |
| F16L 55/04 | (2006.01) |
| F16L 55/07 | (2006.01) |
| F15D 1/10 | (2006.01) |
| F16L 57/00 | (2006.01) |
| F16M 13/02 | (2006.01) |
| F16L 1/12 | (2006.01) |

(52) U.S. Cl.
CPC .......... *F16L 55/0335* (2013.01); *F16L 55/041* (2013.01); *F16L 55/07* (2013.01); *F15D 1/10* (2013.01); *F16L 1/123* (2013.01); *F16L 57/00* (2013.01); *F16M 13/02* (2013.01)

(58) Field of Classification Search
CPC ..... F16L 55/0335; F16L 55/041; F16L 55/07; F16L 1/123; F16L 57/00; F15D 1/10; F16M 13/02
USPC ....................... 405/211, 216; 52/84; 181/207
See application file for complete search history.

(56) References Cited

U.S. PATENT DOCUMENTS

| | | | | |
|---|---|---|---|---|
| 4,722,367 A | * | 2/1988 | Swink | ...................... F15D 1/10 138/178 |
| 6,019,549 A | * | 2/2000 | Blair | ....................... E01D 19/02 24/460 |

(Continued)

*Primary Examiner* — Craig M Schneider
*Assistant Examiner* — David R Deal
(74) *Attorney, Agent, or Firm* — Baker Botts, LLP

(57) ABSTRACT

A helical strake pole system that includes a tubular pole having a longitudinal axis and threaded attachment points. The system further includes a helical strake fin disposed circumferentially around a portion of the tubular pole along the longitudinal axis. The system further includes couplers disposed on the tubular pole. The couplers are configured such that each coupler has a first portion with a slot configured to receive an upper portion of the helical strake fin and a second portion configured to removably coupled to a threaded attachment point of the tubular pole. In addition, each coupler is configured to position a portion of the helical strake fin substantially perpendicular to a surface of the tubular pole.

20 Claims, 6 Drawing Sheets

(56) References Cited

U.S. PATENT DOCUMENTS

| | | | | |
|---|---|---|---|---|
| 6,347,911 B1* | 2/2002 | Blair | ............... | E01D 19/02 |
| | | | | 24/462 |
| 6,896,447 B1* | 5/2005 | Taquino | ............... | E21B 17/01 |
| | | | | 405/216 |
| 6,953,308 B1* | 10/2005 | Horton | ............... | B63B 39/005 |
| | | | | 405/211 |
| 7,458,752 B2* | 12/2008 | Esselbrugge | ......... | B63B 21/502 |
| | | | | 405/216 |
| 7,578,038 B2* | 8/2009 | McMillan | ............ | B63B 21/502 |
| | | | | 29/428 |
| 7,671,812 B1* | 3/2010 | Yasin | ............... | H01Q 1/005 |
| | | | | 343/715 |
| 7,674,074 B2* | 3/2010 | Masters | ............... | E21B 17/01 |
| | | | | 405/216 |
| 7,845,299 B2* | 12/2010 | Masters | ............... | F15D 1/10 |
| | | | | 114/243 |
| 8,256,993 B2* | 9/2012 | Branchut | ............... | F16L 1/123 |
| | | | | 405/224.2 |
| 10,473,131 B1* | 11/2019 | Allen | ............... | F16L 1/123 |
| 2014/0007523 A1* | 1/2014 | Fairbairn | ............... | E04H 12/10 |
| | | | | 52/84 |

\* cited by examiner

HELICAL STRAKE ATTACHMENT FOR TUBULAR STRUCTURAL MEMBERS

TECHNICAL FIELD

This disclosure relates generally to an attachment for pole systems, and more specifically to systems and methods for installing helical strakes onto tubular members.

BACKGROUND

Tubular members are prone to induced vibrations. For example, vibrations can be caused by current flow in water or by wind flow on land. Wind induced vibration of a tubular structural member can produce vibrations that adversely affect the member and its function. Classical vortex-induced vibration results from vortex shedding. In this type of vibration, vortices are created that shed off a member in a rhythm or at a constant frequency when wind flows across the member. Vortices can result in movement of the member in a direction 90 degrees to the direction of flow. When the vortex shedding frequency becomes close to a natural frequency of vibration of the member, then lock-in can occur which may result in large amplitudes and potentially damaging vibrations.

Helical strakes have been successfully utilized on chimneys, smoke stacks, pipelines, and flare stacks in refineries to reduce the potential for vortex-induced vibrations. Typically, helical strakes consist of a thin plate bent to helically wrap around the tubular member. Conventional attachment of strakes requires layout and welding of the strakes to a tubular member in the field. This process involves significant field labor, construction time, and expense. Shipping strakes pre-welded to a tubular member is undesirable due to potential shipping damage to the thin strakes and handling concerns. Thus, it is desirable to provide an improved method for attaching helical strakes to tubular members.

SUMMARY

In one embodiment, the disclosure includes a helical strake pole system that includes a tubular pole having a longitudinal axis and threaded attachment points. The system further includes a helical strake fin disposed circumferentially around a portion of the tubular pole along the longitudinal axis. The system further includes couplers disposed on the tubular pole. The couplers are configured such that each coupler has a first portion with a slot configured to receive an upper portion of the helical strake fin and a second portion configured to be removably coupled to a threaded attachment point on the tubular pole. In addition, each coupler is configured to position a portion of the helical strake fin substantially perpendicular to a surface of the tubular pole.

In another embodiment, the disclosure includes a helical strake pole assembly method. The method includes positioning a helical strake fin circumferentially around a portion of a tubular pole along a longitudinal axis of the tubular pole. The method further includes attaching a plurality of couplers to the tubular pole such that each coupler positions a portion of the helical strake fin substantially perpendicular to a surface of the tubular pole. Attaching a coupler to the tubular pole involves positioning a first portion of the coupler to interface with the helical strake fin and removably coupling a second portion of the coupler to a threaded attachment point of the tubular pole.

Various embodiments present several technical advantages, such as a system that allows allow helical strake fins to be attached to tubular members without requiring welding. A helical strake fin is attached to a tubular member using a coupler. The coupler is configured to be adjustable to accommodate the effects of taper in the tubular member and for inconsistencies in the bend and pitch of the helical strake fin.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Disclosed herein are various embodiments for coupling a helical strake fin to a tubular member. Conventional strake attachment systems require layout and welding of the strakes to a tubular member in the field. This process involves significant field labor, construction time, and expense. Shipping strakes pre-welded to a tubular member is undesirable due to potential shipping damage to the thin strakes and handling concerns. In contrast, the techniques and system disclosed herein allow helical strake fins to be attached to tubular members without requiring welding. A helical strake fin is attached to a tubular member using a coupler. The coupler is configured to be adjustable to accommodate the effects of taper in the tubular member and for inconsistencies in the bend and pitch of the helical strake fin.

Figure 1:
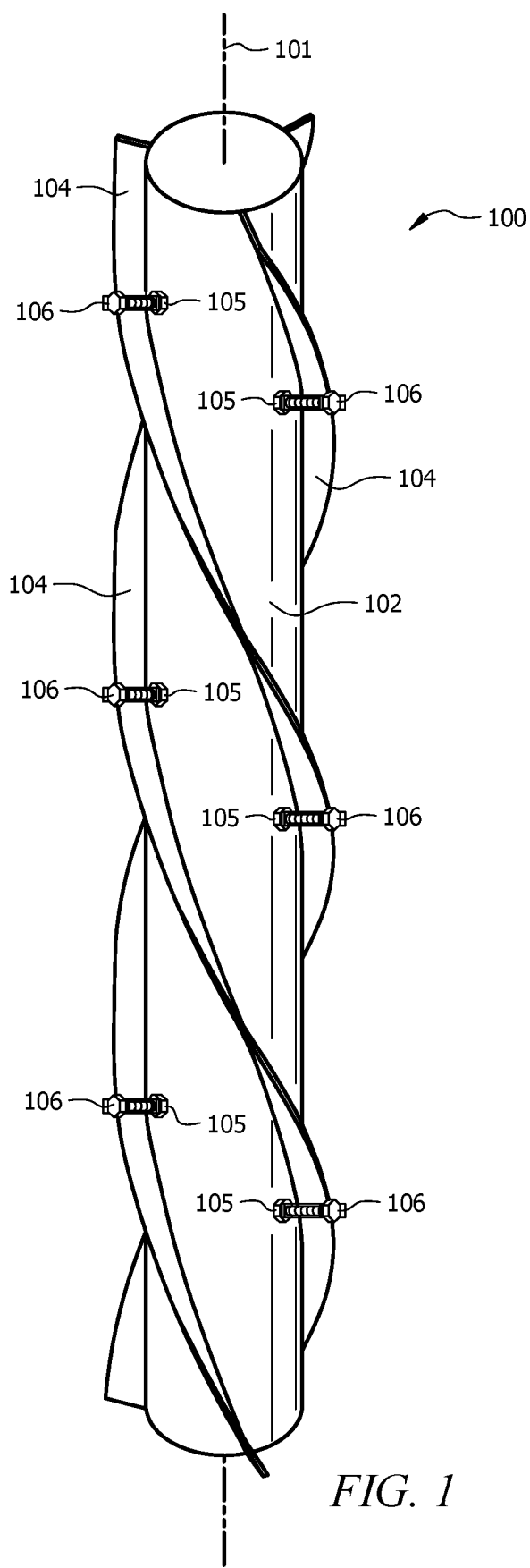
FIG. 1 is a perspective view of an embodiment of a helical strake pole system.

FIG. 1 is a perspective view of an embodiment of a helical strake pole system 100. The helical strake pole system 100 comprises a tubular pole 102, one or more helical strake fins 104, and a plurality of couplers 106.

The one or more helical strake fins 104 may be positioned circumferentially around the outer diameter of the tubular pole 102. A helical strake fin 104 may be configured to have any suitable length and height which extends radially outward from the surface of the tubular pole 102. In addition, a helical strake fin 104 may be configured with any suitable pitch along the length of the tubular pole 102. A helical strake fin 104 may be formed of a metal (e.g. steel or aluminum), a composite (e.g. fiberglass), or any other suitable material as would be appreciated by one of ordinary skill in the art upon viewing this disclosure.

Each coupler 106 is configured to attach to the tubular pole 102 and to attach or support a helical strake fin 104. The couplers 106 may be formed of a metal (e.g. steel or aluminum), a composite (e.g. fiberglass), or any other suitable material as would be appreciated by one of ordinary skill in the art upon viewing this disclosure. Examples of couplers 106 are described in FIGS. 2, 3A-3C, 4A-4C, and 5A-5E.

An example of the tubular pole 102 includes, but is not limited to, an electric power transmission pole. In other examples, the tubular pole 102 may be any other suitable type of tubular structural member for above ground or underwater applications. The tubular pole 102 have any suitable length and diameter (e.g. inner diameter and outer diameter). The tubular pole 102 may be formed of a metal (e.g. steel or aluminum), a composite (e.g. fiberglass), or any other suitable material as would be appreciated by one of ordinary skill in the art upon viewing this disclosure. The tubular pole 102 comprises a plurality of threaded attachment points 105 disposed circumferentially around the tubular pole 102 and along its longitudinal axis 101. The threaded attachment points 105 provide an interface for coupling couplers 106 to the tubular pole 102. An example of a threaded attachment point 105 includes, but is not limited to, a threaded bolt hole, a threaded bolt, or a nut welded onto the tubular pole 102. The tubular pole 102 may comprise any suitable number of threaded attachment points 105 which may be distributed anywhere along the surface of the tubular pole 102. Examples of using the threaded attachment points 105 to couple the helical strake fin 104 and the couplers 106 to the tubular pole 102 are described in FIGS. 2, 3A-3C, 4A-4C, and 6.

Figure 2:
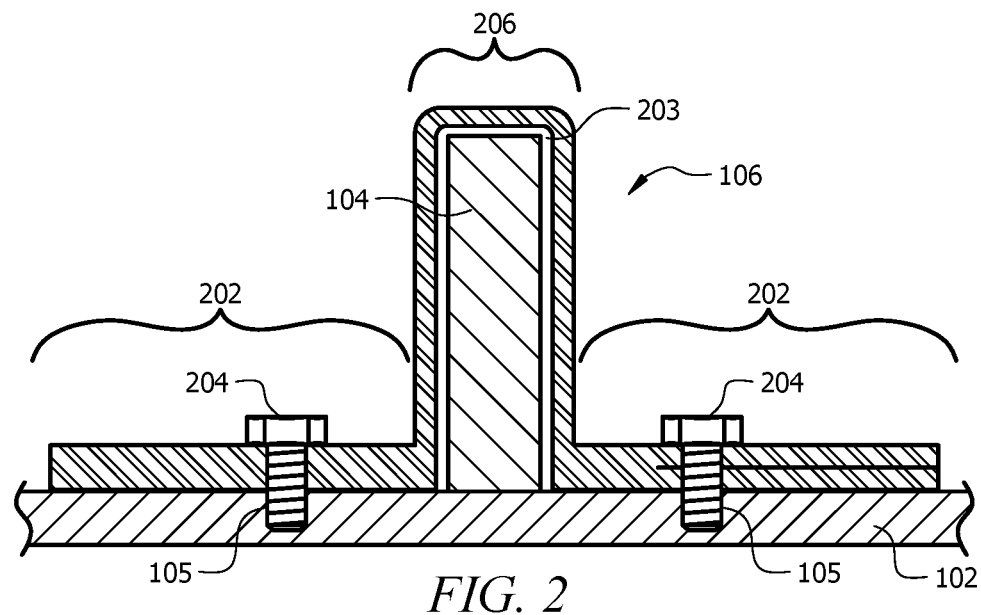
FIG. 2 is a partial cutaway view of an embodiment of a coupler for attaching a helical strake fin to a tubular pole.

FIG. 2 is a partial cutaway view of an embodiment of a coupler 106 for attaching a helical strake fin 104 to a tubular pole 102. A portion 202 of the coupler 106 is configured to be removably coupled to a threaded attachment point 105 of the tubular pole 102. For example, the portion 202 may comprise one or more holes, slots, or openings that allows bolts 204 to pass through the coupler 106 to for attaching the coupler 106 to the tubular pole 102. In this configuration, the coupler 106 is attached to the tubular pole 102 using threaded attachment points 105 on opposing sides of the helical strake fin 104. In one embodiment, the coupler 106 may be attached to the threaded attachment points 105 using bolts or screws 204. In other embodiment, the coupler 106 may be attached to the threaded attachment points 105 using nuts when the threaded attachment points 105 are threaded bolts protruding from the tubular pole 102. In other embodiments, the coupler 106 may be attached to the threaded attachment points 105 using any other suitable technique for removably coupling the coupler 106 to the tubular pole 102. In one embodiment, the portion 202 of the coupler 106 may comprise slotted openings that allow the position of the coupler 106 to be adjusted before securing the coupler 106 using bolts 204. For example, the coupler 106 may be rotated with respect to the surface of the tubular pole 102 to compensate for inconsistencies with the helical strake fin 104 before securing the coupler 106 to the tubular pole 102.

Another portion 206 of the coupler 106 is configured to receive and/or support the helical strake fin 104. The helical strake fin 104 is positioned within a groove, crimp, slot, or recess 203 of the coupler 106. The coupler 106 is configured to position the helical strake fin 104 to be substantially perpendicular to the surface of the tubular pole 102. In other words, the coupler 106 positions the helical strake fin 104 such that it extends radially away from the surface of the tubular pole 102. In one embodiment, the coupler 106 may be formed using a pliable or semi-rigid material (e.g. aluminum) that allows the coupler 106 shape to be manipulated to compensate for inconsistencies in the bend and pitch of the helical strake fin 104.

Figure 3A:
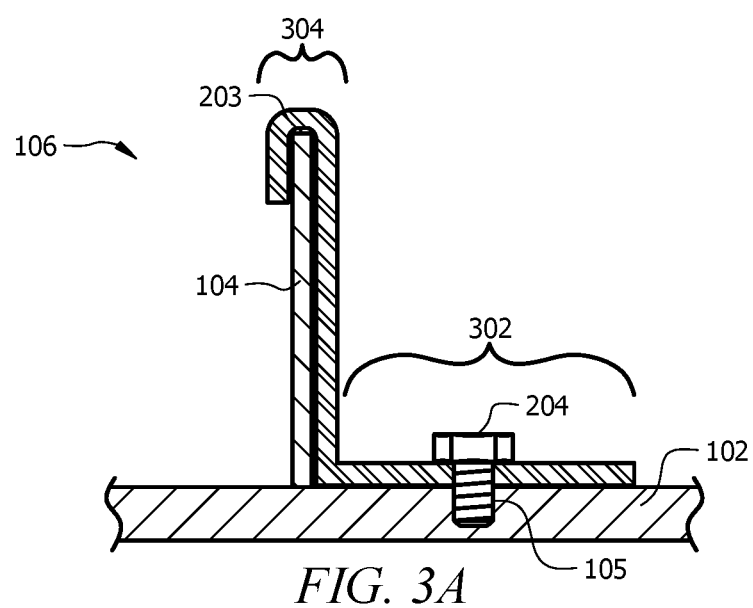
FIG. 3A-3C are partial cutaway views of other embodiments of a coupler for attaching a helical strake fin to a tubular pole.
Figure 3B:
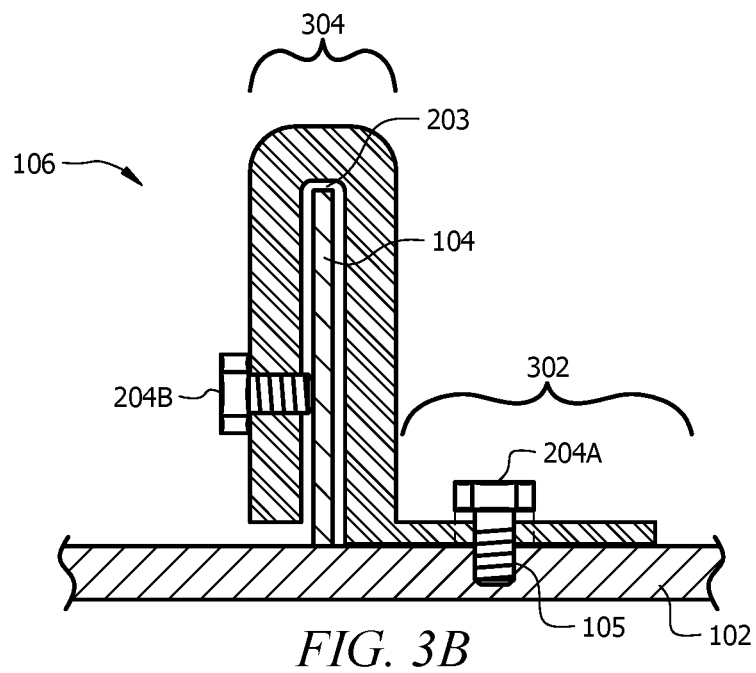
Figure 3C:
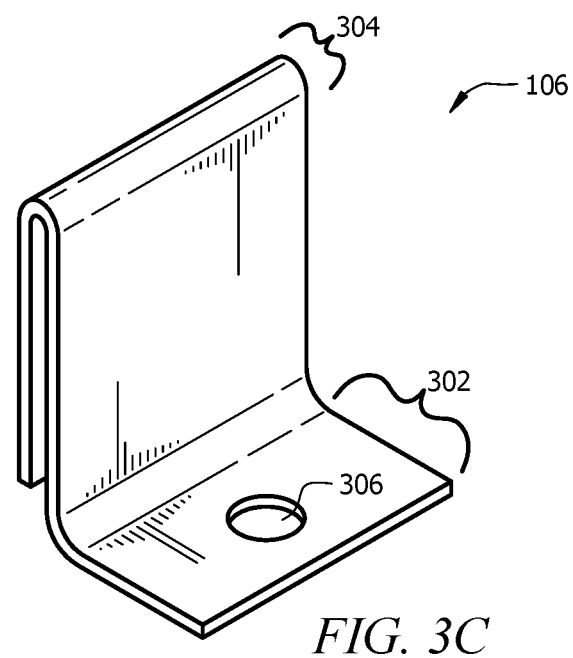

FIG. 3A-3C are partial cutaway views of other embodiments of a coupler 106 for attaching a helical strake fin 104 to a tubular pole 102. In FIGS. 3A-3C, the coupler 106 is configured to attach to the tubular pole 102 on one side of a helical strake fin 104.

In FIG. 3A, a portion 302 of the coupler 106 is configured to be removably coupled to a threaded attachment point 105 of the tubular pole 102. For example, the portion 302 may comprise a hole, slot, or opening configured similar to the coupler 106 described in FIG. 2. In one embodiment, the coupler 106 may be attached to the threaded attachment points 105 using bolts or screws 204. In other embodiments, the coupler 106 may be attached to the threaded attachment points 105 using any other suitable technique for removably coupling the coupler 106 to the tubular pole 102. In one embodiment, the portion 302 of the coupler 106 may comprise slotted openings that allow the position of the coupler 106 to be adjusted before securing the coupler 106 using bolts 204. For example, the coupler 106 may be rotated with respect to the surface of the tubular pole 102 to compensate for inconsistencies with the helical strake fin 104 before securing the coupler 106 to the tubular pole 102.

Another portion 304 of the coupler 106 is configured to receive and/or support the helical strake fin 104. The helical strake fin 104 is positioned within a groove, crimp, slot, or recess 203 of the helical coupler 106. The coupler 106 is configured to position the helical strake fin 104 to be substantially perpendicular to the surface of the tubular pole 102. In other words, the coupler 106 positions the helical strake fin 104 such that it extends radially away from the surface of the tubular pole 102. In one embodiment, the coupler 106 may be formed using a pliable or semi-rigid material (e.g. aluminum) that allows the coupler 106 shape to be manipulated to compensate for inconsistencies in the bend and pitch of the helical strake fin 104. In FIG. 3A, the portion 304 of the coupler 106 configured to receive the helical strake fin 104 substantially covers one side of the helical strake fin 104 and only partially covers the opposing side of the helical strake fin 104. In other embodiments, the portion 304 may be configured to cover or support any other suitable amount of the sides of the helical strake fin 104.

In FIG. 3B, the coupler 106 is configured similar to the coupler 106 described in FIG. 3A. In this embodiment, the portion 304 of the coupler 106 configured to receive the helical strake fin 104 substantially covers both sides of the helical strake fin 104. In one embodiment, the coupler 106 comprises one or more openings for allow bolts 204 to pass through the coupler 106 to secure the helical strake fin 104 within the slot 203 of the coupler 106. For example, the coupler 106 may be configured to receive a first bolt 204A for securing the coupler 106 to the tubular pole 102 and a second bolt 204B (e.g. a set screw) for coupling the helical strake fin 104 to the coupler 106. Adjusting the second bolt 204B applies a force onto the helical strake fin 104 to couple the helical strake fin 104 to the coupler 106. In this configuration, the coupler 106 provides mechanical interface for coupling the helical strake fin 104 with the coupler 106. In some embodiments, the coupler 106 may use multiple set screws to apply a force onto the helical strake fin 104.

FIG. 3C, is a perspective view of the coupler 106 described in FIG. 3B. In this embodiment, the coupler 106 comprises a single opening 306 for receiving a bolt 204 to attach the coupler 106 to a tubular pole 102. In other embodiments, the coupler 106 may comprise any other suitable number of openings 306 for receiving bolts 204 to attach the coupler 106 to a tubular pole 102.

Figure 4A:
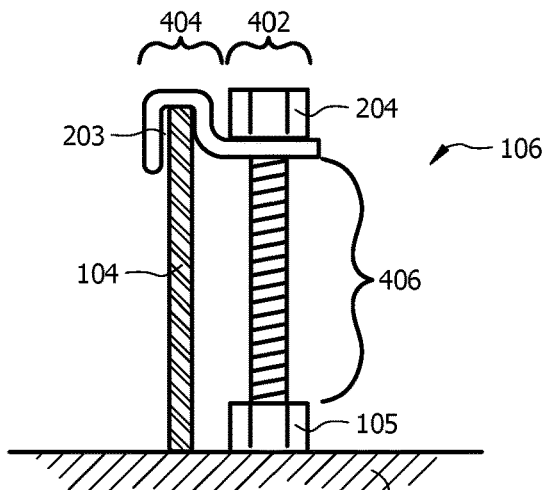
FIGS. 4A-4C are partial cutaway views of other embodiments of a coupler with a threaded portion.
Figure 4B:
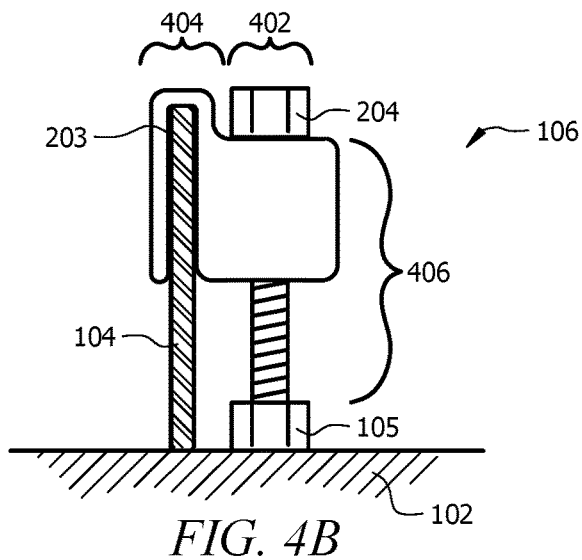
Figure 4C:
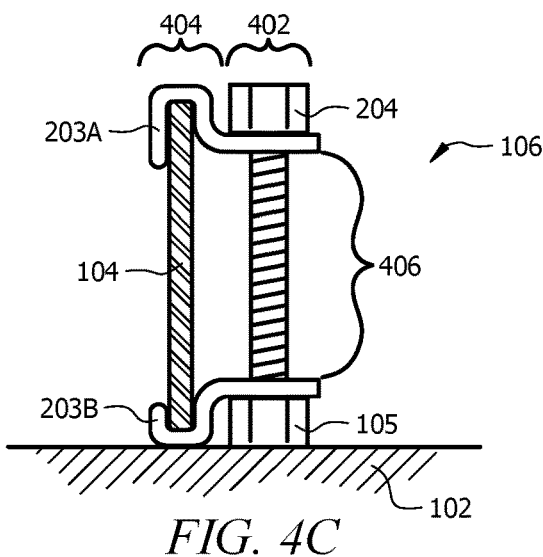
Figure 5A:
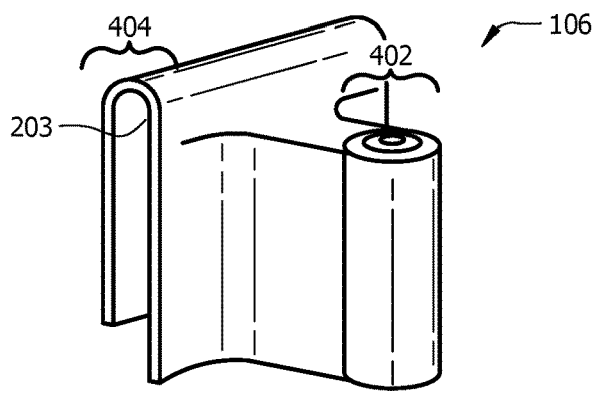
FIGS. 5A-5E are perspective views of embodiments of a coupler.
Figure 5B:
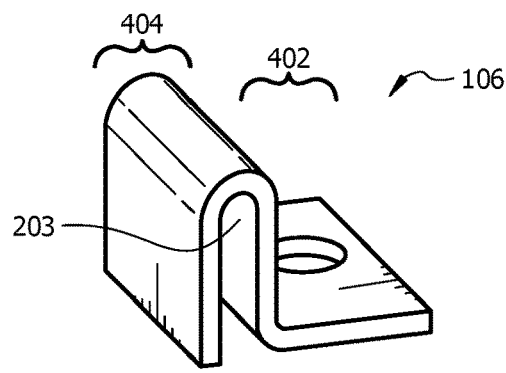
Figure 5C:
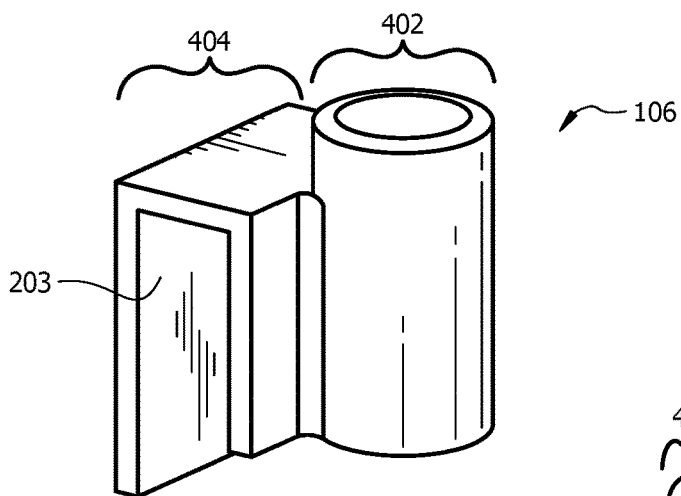
Figure 5D:
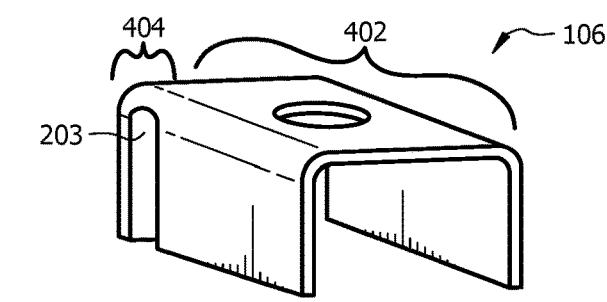
Figure 5E:
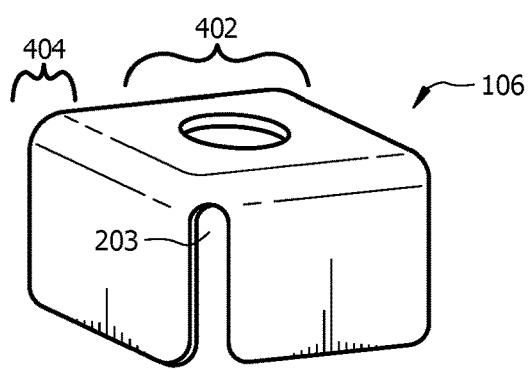

FIGS. 4A-4C are partial cutaway views of other embodiments of a coupler 106 with a threaded portion. In FIGS. 4A-4C, the coupler 106 is configured to employ a threaded portion that allows the coupler 106 to adapt to variations in the height a helical strake fin 104.

In FIG. 4A, a portion 402 of the coupler 106 is configured to be removably coupled to a threaded attachment point 105 of the tubular pole 102. For example, the portion 402 may comprise a hole, slot, or opening configured similar to the coupler 106 described in FIG. 2. In one embodiment, the coupler 106 may be attached to the threaded attachment points 105 using bolts or screws 204. In other embodiments, the coupler 106 may be attached to the threaded attachment points 105 using any other suitable technique for removably coupling the coupler 106 to the tubular pole 102. In one embodiment, the portion 402 of the coupler 106 may comprise slotted openings that allow the position of the coupler 106 to be adjusted before securing the coupler 106 using bolts 204. For example, the coupler 106 may be rotated with respect to the surface of the tubular pole 102 to compensate for inconsistencies with the helical strake fin 104 before securing the coupler 106 to the tubular pole 102.

Another portion 404 of the coupler 106 is configured to receive and/or support the helical strake fin 104. The helical strake fin 104 is positioned within a groove, crimp, slot, or recess 203 of the coupler 106. The coupler 106 is configured to position the helical strake fin 104 to be substantially perpendicular to the surface of the tubular pole 102. In other words, the coupler 106 positions the helical strake fin 104 such that it extends radially away from the surface of the tubular pole 102. In one embodiment, the coupler 106 may be formed using a pliable or semi-rigid material (e.g. aluminum) that allows the coupler 106 shape to be manipulated to compensate for inconsistencies in the bend and pitch of the helical strake fin 104. In FIG. 4A, the portion 404 of the coupler 106 configured to receive the helical strake fin 104 only partially covers the sides of the helical strake fin 104. In other embodiments, the portion 404 may be configured to cover or support any other suitable amount of the sides of the helical strake fin 104.

The coupler 106 further comprises a threaded portion 406. In one embodiment, the threaded portion 406 may be provided by the bolt 204 used to attach the coupler 106 to the tubular pole 102. In another embodiment, the threaded portion 406 may be provided using a different bolt or threaded rod. The threaded portion 406 is configured to adjust the position of the portion 404 of the coupler 106 with respect to the length of the threaded portion 406. In other words, the threaded portion 406 allows the coupler 106 to adapt for short or taller helical strake fins 104. This feature allows the coupler 106 to be adjusted to compensate for inconsistencies in the height of the helical strake fin 104.

In FIG. 4B, the coupler 106 is configured similar to the coupler 106 described in FIG. 4A. In this embodiment, the portion 404 of the coupler 106 configured to receive the helical strake fin 104 covers of the surface of the helical strake fin 104 on both sides of the helical strake fin 104. In some embodiments, the coupler 106 comprises one or more openings for allow bolts 204 to pass through the coupler 106 to secure the helical strake fin 104 within the slot 203 of the coupler 106 similar to the configuration described in FIG. 3B. In this configuration, the coupler 106 provides mechanical interface for coupling the helical strake fin 104 with the coupler 106.

In FIG. 4C, the coupler 106 is configured similar to the coupler 106 described in FIG. 4A. In this embodiment, the portion 404 of the coupler 106 comprises a first slot 203A configured to receive a first portion (e.g. an upper portion) of the helical strake fin 104 and a second slot 203B configured to receive a second portion (e.g. a lower portion) of the helical strake fin 104. The first slot 203A and the second slot 203B may be configured to cover any suitable amount of the surface of the helical strake fin 104. In this configuration, the coupler 106 provides support at both ends of the helical strake fin 104 for coupling and maintaining the position of the helical strake fin 104 with respect to the tubular pole 102.

FIGS. 5A-5E are perspective views of embodiments of a coupler 106. In one embodiment, the couplers 106 illustrated in FIGS. 5A-5E may be used and configured similar to the couplers 106 described in FIGS. 2, 3A-3C, and 4A-4C.

Figure 6:
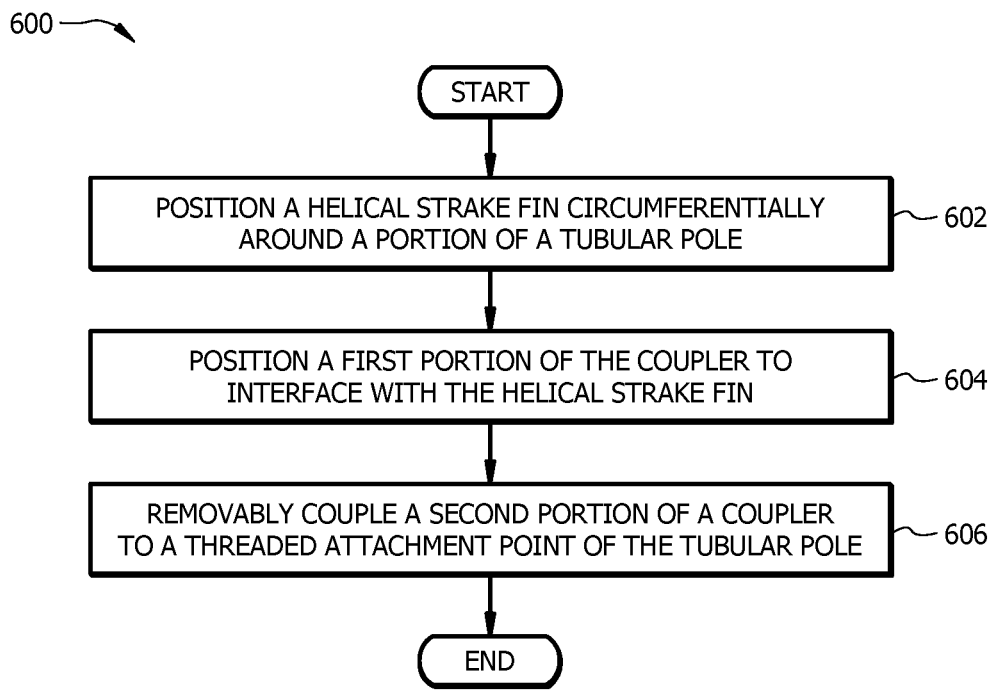
FIG. 6 is a flowchart of an embodiment of a helical strake pole assembly method.

FIG. 6 is a flowchart of an embodiment of a helical strake pole assembly method 600. Method 600 may be implemented by a technician or installer to attach a helical strake fin 104 to a tubular pole 102. In one embodiment, the technician may attach the helical strake fin 104 to the tubular pole 102 in the field or at a work site. In other embodiments, the technician may attach the helical strake fin 104 to the tubular pole 102 at a different location before delivering the helical strake pole system to a distributor, an end-user, or work site. The assembled helical strake pole system may employ couplers 106 similar to the couplers 106 described in FIGS. 2, 3A-3C, 4A-4C, and 5A-5E and/or similar variations.

At step 602, a technician positions a helical strake fin 104 circumferentially around a portion of a tubular pole 102. The technician positions the helical strake fin 104 around the outer diameter of the tubular pole 102. Any suitable length of the helical strake fin 104 may be disposed onto the tubular pole 102.

At step 604, the technician positions a first portion of the coupler 106 to interface with the helical strake fin 104. For example, the technician may position a portion of the helical strake fin 104 within a slot 203 of the coupler 106. The slot 203 of coupler 106 may partially or substantially cover the sides of the helical strake fin 104.

In one embodiment, the technician may install or adjust a set screw 204 in the first portion of the coupler 106 to couple the helical strake fin 104 with the coupler 106. In this example, adjusting the set screw applies a force onto the helical strake fin 104 to couple the helical strake fin 104 to the coupler 106.

In one embodiment, the technician may adjust the height of the first portion of the coupler 106 with respect to a threaded portion of the coupler 106. In this example, the technician may raise or lower the height of the first portion of the coupler 106 to interface and secure the helical strake fin 104.

At step 606, the technician couples a second portion of a coupler 106 to a threaded attachment point 105 of the tubular pole 102. For example, the technician may use one or more bolts 204 to removably couple the coupler 106 to the tubular pole 102, and thereby, couple the helical strake fin 104 to the tubular pole 102. The coupler 106 may be fastened to the tubular pole 102 on one or both sides of the helical strake fin 104. The technician may rotate the first portion and/or the second portion of the coupler 106 about the threaded attachment point 105 prior to securely fastening the coupler 106 to the tubular pole 102. In some embodiments, the technician may apply adhesive or a thread locker to the threaded attachment points 105 to provide a more secure connection between the threaded attachment points 105 and the bolts 204.

The technician may repeat steps 604 and 606 any suitable number of times to attach additional couplers 106 to the tubular pole 102 to support the helical strake fin 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A helical strake system, comprising:
   a tubular pole having a longitudinal axis and comprising a plurality of threaded attachment points;
   a helical strake fin disposed circumferentially around a portion of the tubular pole along the longitudinal axis;
   a plurality of couplers disposed on the tubular pole, wherein:
      each coupler comprises:
         a first portion comprising a slot configured to receive an upper portion of the helical strake fin; and
         a second portion configured to be removably coupled to a threaded attachment point of the tubular pole; and
      each coupler configured to position a portion of the helical strake fin substantially perpendicular to a surface of the tubular pole.

2. The system of claim 1, wherein:
   the second portion of the coupler is coupled to:
      a respective first attachment point on one side of the helical strake fin; and
      a respective second attachment point on an opposing side of the helical strake fin.

3. The system of claim 1, wherein:
   the slot in the first portion of each coupler is configured to:
      substantially cover one side of the helical strake fin disposed within the coupler; and
      partially cover an opposing side of the helical strake fin disposed within the coupler.

4. The system of claim 1, wherein:
   the slot in the first portion of each coupler is configured to:
      substantially cover one side of the helical strake fin disposed within the coupler; and
      substantially cover an opposing side of the helical strake fin disposed within the coupler.

5. The system of claim 1, wherein the first portion of each coupler comprises a set screw configured to apply a force onto a portion of the helical strake fin.

6. The system of claim 1, wherein:
   the second portion of each coupler comprises a second slot configured to receive a lower portion of the helical strake fin.

7. The system of claim 1, wherein:
   each coupler comprises a threaded portion; and
   the position of the first portion of each coupler is adjustable along the threaded portion.

8. The system of claim 7, wherein the first portion of each coupler is configured to rotate about the threaded portion.

9. The system of claim 7, wherein the second portion of each coupler is configured rotate about the threaded portion.

10. The system of claim 7, wherein the threaded portion of each coupler is a bolt configured to attach the coupler to the threaded attachment point of the tubular pole.

11. A helical strake pole assembly method, comprising:
    positioning a helical strake fin circumferentially around a portion of a tubular pole along a longitudinal axis of the tubular pole, wherein the tubular pole comprises a plurality of threaded attachment points;
    attaching a plurality of couplers to the tubular pole, wherein:
       each coupler is configured to position a portion of the helical strake fin substantially perpendicular to a surface of the tubular pole; and
       attaching a coupler to the tubular pole comprises:
          positioning a first portion of the coupler to interface with the helical strake fin, wherein the first portion comprises a slot configured to receive an upper portion of the helical strake fin; and
          removably coupling a second portion of the coupler to a threaded attachment point of the tubular pole.

12. The method of claim 11, wherein attaching the coupler comprises attaching the second portion of each coupler to:
    a respective first threaded attachment point on one side of the helical strake fin; and
    a respective second threaded attachment point on an opposing side of the helical strake fin.

13. The method of claim 11, wherein the slot in the first portion of each coupler is configured to:
    substantially cover one side of the helical strake fin disposed within a coupler; and
    partially cover an opposing side of the helical strake fin disposed within the coupler.

14. The method of claim 11, wherein the slot in the first portion of each coupler is configured to:
    substantially cover one side of the helical strake fin disposed within the coupler; and
    substantially cover an opposing side of the helical strake fin disposed within the coupler.

15. The method of claim 11, wherein attaching the coupler comprises adjusting a set screw in the first portion of the coupler, wherein adjusting the set screw applies a force onto a portion of the helical strake fin.

16. The method of claim 11, wherein the second portion of each coupler comprises a second slot configured to receive a lower portion of the helical strake fin.

17. The method of claim 11, wherein:

each coupler comprises a thread portion; and attaching the coupler comprises adjusting the position of the first portion of the coupler with respect to the threaded portion.

18. The method of claim 17, wherein the first portion of each coupler is configured to rotate about the threaded portion.

19. The method of claim 17, wherein the second portion of each coupler is configured rotate about the thread portion.

20. The method of claim 17, wherein:

the threaded portion of each coupler is a bolt; and attaching each coupler comprises attach each coupler to the threaded attachment point of the tubular pole using the bolt.

\* \* \* \* \*